United States Patent

[11] 3,545,706

| [72] | Inventor | Milton M. Harshman |
| | | Sullivan, Illinois 0 |
| [21] | Appl. No. | 770,619 |
| [22] | Filed | Oct. 25, 1968 |
| [45] | Patented | Dec. 8, 1970 |
| [73] | Assignee | Yard-Man of Illinois, Incorporated |
| | | Sullivan, Illinois |

[54] VIBRATION SUPPRESSING ENGINE MOUNT
7 Claims, 8 Drawing Figs.

[52] U.S. Cl. .................................................... 248/15, 248/21
[51] Int. Cl. ...................................................... F16f 15/06
[50] Field of Search ........................................... 248/15, 14, 17, 18, 20, 21

[56] References Cited
UNITED STATES PATENTS

| 2,685,178 | 8/1954 | Eck ................................ | 248/18 |
| 2,823,598 | 2/1958 | Jenn .............................. | 248/18 |
| 2,894,489 | 7/1959 | Clay .............................. | 248/15 |
| 3,185,415 | 5/1965 | Thorn............................ | 248/21 |
| 3,268,199 | 8/1966 | Kordyban et al. ............ | 248/21 |
| 3,351,307 | 11/1967 | Michel et al. ................. | 248/18 |

Primary Examiner—Marion Parsons, Jr.
Attorney—Beaman & Beaman

ABSTRACT: A mount for an internal combustion engine for particular use with relatively small engines, and of particular advantage with vertically oriented crankshaft engines having a horizontally disposed mounting bracket, including means for anchoring and mounting the engine to a supporting member to effectively suppress and absorb engine vibrations, the anchoring means for the engine including mounting structure specifically related to the engine center of gravity.

PATENTED DEC 8 1970

3,545,706

INVENTOR
MILTON M. HARSHMAN
BY Beaman & Beaman
ATTORNEYS

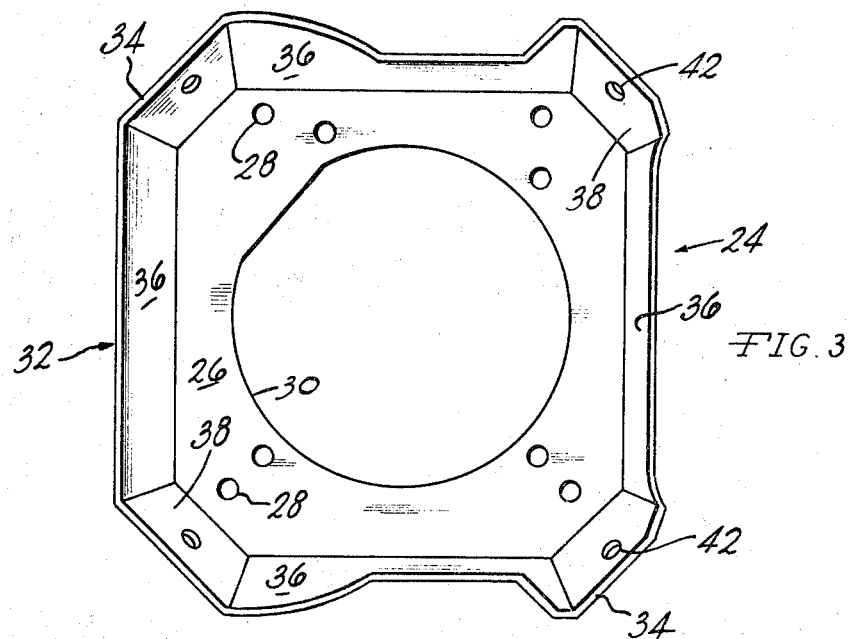
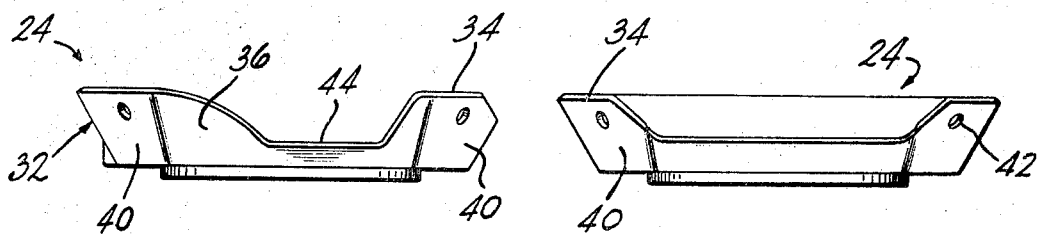
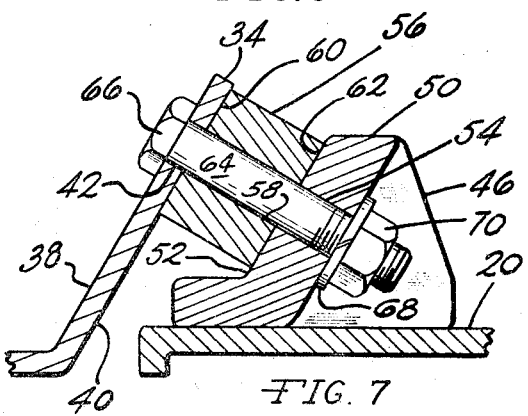
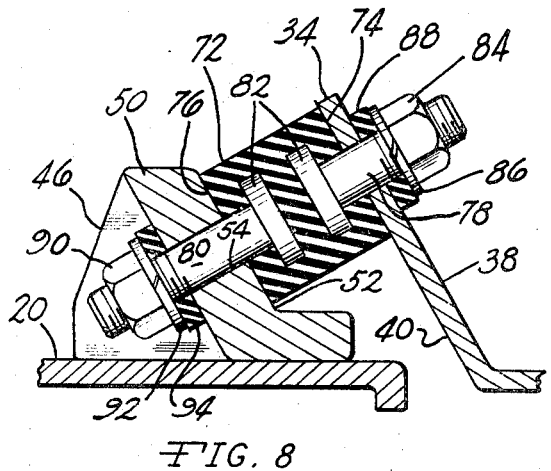

VIBRATION SUPPRESSING ENGINE MOUNT

BACKGROUND OF THE INVENTION

The invention pertains to the field of suppressing internal combustion engine vibrations, and particularly relates to the suppression of vibrations in engines having mounting surfaces perpendicularly disposed to the axis of crankshaft rotation.

Prior to the popular acceptance of the rotary lawn mower, internal combustion engines of less than 10 h.p. were usually constructed such that the axis of crankshaft rotation was horizontally disposed, and the mounting surface for the engine was likewise horizontally disposed. Thus, vibrations imposed upon the engine due to the rotating crankshaft, and the reciprocal movement of the piston and piston rod, were primarily directed transverse to the engine mounting surface. Thus, only small shear forces were imposed upon the mounting bolts maintaining the engine upon the supporting member and a simple "bolt on" mounting for the motor provided acceptable operating conditions.

The popularity of the rotary lawn mower resulted in the development of gasoline internal combustion engines having a vertically oriented crankshaft which was able to extend below the housing or deck of the mower, permitting the blade, or a drive pulley or sheave connected to the blade, to be related in a horizontal manner. This type of vertically disposed crankshaft engine is now manufactured in large quantities in a number of power sizes.

The vertical crankshaft engines currently available employ a mounting surface which is disposed in a horizontal manner, in that invariably, the mounting surface on the mower, or other equipment with which the engine is utilized, is also disposed in a horizontal direction. The vertical orientation of the crankshaft causes the vibrations created within the engine by the piston, piston rod and crankshaft to be primarily in a horizontal direction, i.e. parallel to the engine mounting and supporting surfaces. Thus, the primary vibration forces now occur in a direction parallel with the engine mounting surface and shear forces are imposed upon the mounting bolts of the engine.

Vertical crankshaft engines using horizontal mounting surfaces do not cause serious vibration problems in the smaller engine sizes. However, in a vertical crankshaft engine of the larger sizes, such as above 5 h.p., the horizontal vibrations are of such magnitude due to the increased weight of the engine components that serious vibration problems are encountered. As the vertical crankshaft engine is compact, and readily adaptable to a number of uses other than lawn mowers, for instance as with small tractors and the like, and as such equipment usually requires an engine greater than 5 h.p., the vibration problem with this type of engine has become of serious concern. One engine manufacturer has found it necessary to provide special counterbalancing means with the larger size vertical crankshaft engines to overcome the vibration problems, and the modification and special design of this engine has added considerably to its cost.

SUMMARY OF THE INVENTION

It is an object of the invention to provide mounting means for an internal combustion engine of the vertical crankshaft type which permits an engine of conventional manufacture and cost to be used and properly mounted without subjecting the engine, and the mounting member, to the excessive and harmful vibrations encountered with conventional engine mounting means.

In the practice of the invention the engine is mounted upon a base plate having a central region and a peripheral region. The central region is of a planar configuration adapted to support the mounting base of the engine, and the engine is bolted thereon. The peripheral region of the base plate includes anchor portions obliquely disposed to the horizontal having holes defined therein for receiving fastening means anchored to the engine support member.

Elongated fastening means are interposed between the supporting member and the engine base plate peripheral anchor regions. These elongated fastening means include an axis which, if projected into the engine, substantially pass through the engine center of gravity. Also, the peripheral region anchor, and the engaging pad defined upon the supporting member, include bearing surfaces perpendicularly disposed to the axis of the fastening members against which the fastening members bear.

The aforementioned engine mounting assembly results in a plurality of fastening members having axes which substantially pass through the engine center of gravity, and which are obliquely related to the plane of the engine mounting surface. Thus, the horizontal vibration forces created within the engine do not produce the magnitude of shear forces within the fastening means as the conventional mounting for a vertically oriented crankshaft engine and the engine vibration can be effectively controlled.

The fastening means includes both rigid and elastomer components. The rigid fastening means insure that the engine will be properly located upon the support member, and the vibration dampening means suppress and control the vibrations created in the engine, and prevent excessive engine vibrations from being transmitted to the support member The base plate of the invention is of a recessed dish-shape which permits the engine to be mounted relatively low with respect to the support member surface having an opening defined therein for receiving the base plate, and the utilization of the inventive concept has permitted the larger sizes of vertical crankshaft engines to be effectively employed in those installations previously requiring specially balanced engines. As the cost of the engine mounting apparatus of the invention is considerably less than the cost of a modified, specially balanced engine a considerable economic advantage, as well as improved operating conditions and vibration suppression result from the practice of the invention.

BRIEF DESCRIPTION OF THE DRAWINGS

The aforementioned objects of the invention will be appreciated from the following description and accompanying drawings wherein:

FIG. 3 is a plan view of the engine base plate, per se, FIG. 5 is an elevational view of the engine base plate taken from the bottom of FIG. 3, FIG. 6 is an elevational view of the base plate as taken from the right of FIG. 3, FIG. 7 is an enlarged, elevational sectional view of a rigid fastening means as taken along Section VII-VII of FIG. 2, and FIG. 8 is an enlarged, elevational sectional view taken through an elastomer fastening means along Section VIII-VIII of FIG. 2.

DESCRIPTION OF THE PREFERRED EMBODIMENT

Figure 1:
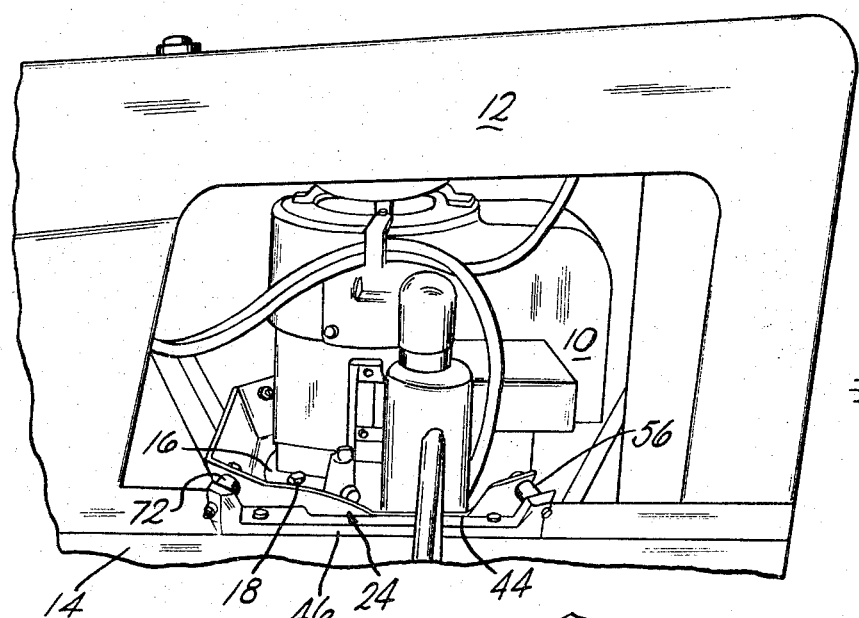
FIG. 1 is a detail, elevational view of an engine mounted within a tractor upon a mount constructed in accord with the invention.

The environment in which the invention is used will be appreciated from FIG. 1 wherein a vertical crankshaft internal combustion engine 10 is mounted within a small yard tractor which includes a hood 12 and a chassis or frame 14. The engine 10 includes a horizontally disposed mounting flange 16 in which holes are defined for receiving the conventional engine mounting bolts 18, whereby nuts upon these bolts firmly affix the engine to its mounting or support member. In FIG. 1 the front of the tractor is represented at the right, and the rear of the tractor, not shown, extends to the left.

Figure 2:
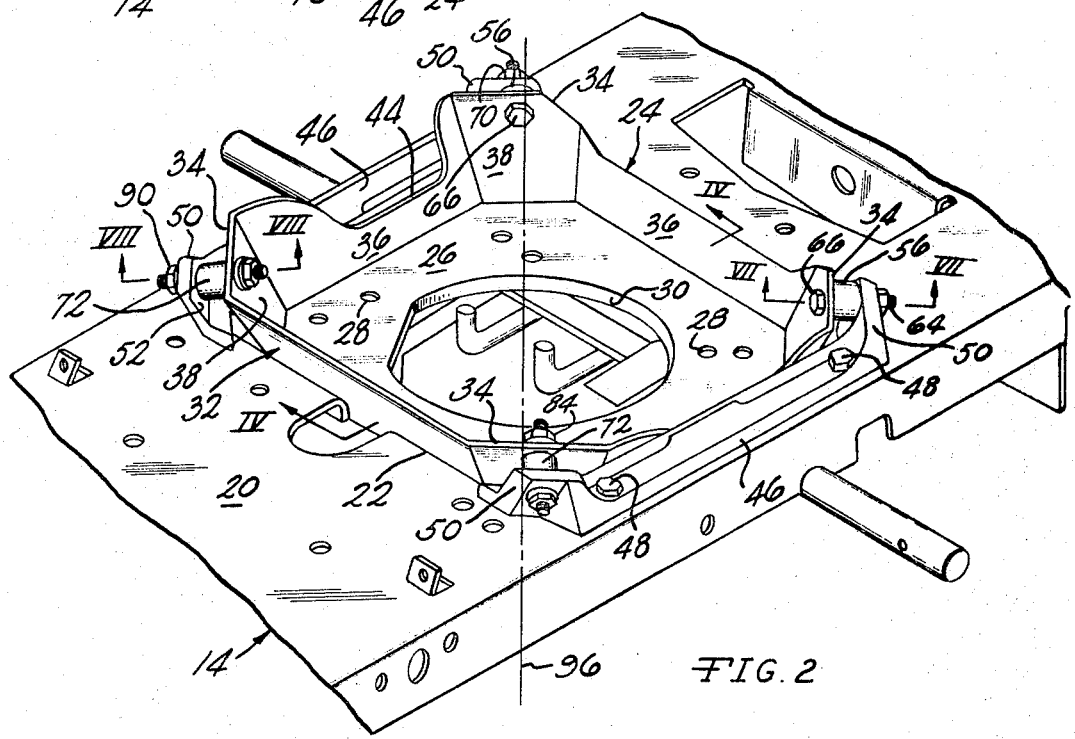
FIG. 2 is an enlarged, perspective view of an engine base plate in accord with the invention as mounted upon a supporting member.
Figure 4:
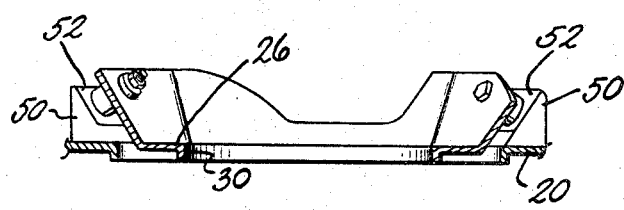
FIG. 4 is an elevational, sectional view taken along Section IV-IV of FIG. 2.

The tractor chassis 14 is of an inverted U configuration, FIG. 2, and includes a horizontally disposed planar portion 20 having an opening 22 defined therein adapted to receive the engine mounting base plate generally indicated at 24.

The engine mounting base plate 24 may be formed of a sheet steel material of a thickness approximately one quarter of an inch, and includes a flat central region 26 having a plurality of holes 28 defined therein. The bolts 18 are inserted through the holes 28 whereby the engine 10 may be firmly and rigidly connected to the base plate central region 26. As apparent in FIG. 2 the central region 26 includes an opening 30 through which the lower portion of the engine extends, and the lower portion of the engine crankshaft extends through this opening, and will usually include a drive pulley affixed to the crankshaft which will be belted to the tractor transmission, not shown.

The base plate 24 includes a peripheral region generally indicated at 32. The peripheral region includes corner or anchor portions 34 interconnected by side portions 36 which result in a dish-configuration for the base plate, and also forming the base plate in a generally rectangular shape as to conform to the opening 22 in the vehicle chassis.

The anchor portions 34 are obliquely disposed to the horizontal at at an angle approximately 60° thereto and include an inner surface 38, and an outer bearing surface 40. Also, each of the anchor portions includes a hole 42 defined therein.

The peripheral region side portions 36 integrally interconnect the anchor portions 34 adding strength to the base plate, and the anchor portions, and these sides may be "cut out" or recessed as at 44, FIG. 2, for purposes of providing clearance for engine components, such as a started, carburetor, muffler or the like.

Mounting pads are defined upon the vehicle frame portion 20, and in the illustrated embodiment these pads are located upon elongated castings 46 bolted to the frame by bolts 48. The castings 46 include end portions 50 angularly related at a 60° angle to the horizontal to define pads each including a flat bearing surface 52 disposed toward an opposed bearing surface 40 defined upon an anchor portion 34. A hole 54, FIG. 7, is defined in each of the pads 50 perpendicularly disposed to the associated bearing surface 52.

The base plate 24 is mounted to the pads 50 in a manner best appreciated from FIGS. 7 and 8. The front pads 50, i.e. the pads appearing at the right of FIG. 1, and at the top and right of FIG. 2, associate with a metal sleeve 56 having an axial bore 58 therethrough. The elongated sleeves 56 include an end 60, and an end 62 perpendicularly disposed to the axis of the sleeve bore 58. Thus, a bolt 64 having a head 66 may be inserted through the associated anchor hole 42, the sleeve bore 58 and the pad hole 54, and a washer 68 and nut 70 applied to the threaded end of the bolt. Tightening of the bolt 64 maintains the sleeve end 60 in firm engagement with the anchor surface 40, and the sleeve end 62 in firm engagement with the pad surface 52. In this manner the front end of the base plate 24 will be substantially rigidly affixed to the frame 14.

The "rear" fastening means for the engine base plate 24 appear at the left of FIG. 1, and at the left and bottom of FIG. 2. The "rear" fastening means consists of an elastomer member 72, FIG. 8, such as formed of hard rubber, neoprene, or other vibration absorbing material. The vibration absorbing members 72 include opposed ends 74 and 76 perpendicularly disposed to the member, and threaded studs 78 and 80 are embedded within the members coaxial with the axis thereof. The threaded studs each include a head 82, whereby the stud heads are in spaced relationship to each other, and the studs are firmly embedded in the elastomer material.

The thread stud 78 extends through the anchor hole 42, and the stud 80 extends through the pad hole 54. A nut 84 is applied to the stud 78 which bears upon the washer 86 which in turn bears upon an elastomer washer 88 engaging the inside surface 38 of the anchor portion. Tightening of the nut 84 places the sleeve end 74 in firm engagement with the associated anchor surface 40.

The stud 80 extends through the pad hole 54 and the nut 90 is applied thereto which bears upon the washer 92 which in turn bears upon the elastomer washer 94. Tightening of the nut 90 maintains the elastomer end 76 in firm engagement with the pad surface 52.

As will be apparent from FIG. 2, a rigid sleeve 56 and an elastomer member 72 are in substantially diametrically opposed relationship as compared with the the axis of rotation of the engine as represented by line 96, FIG. 2. Additionally, the angle of the anchor portions 34, and the pad surfaces 52 is such that a projection of the axes of the sleeves 56 and the members 72 substantially intersect and pass through the center of gravity of the engine. Due to the aforementioned relationships, the primary vibrational forces produced within the engine will be directed parallel to the axes of the bolts 64 and the studs 78 and 80, which places the primary vibrational forces upon the sleeves 56 and members 72 parallel to their axes.

It has been found that the aforedescribed engine mounting assembly very effectively absorbs and controls the vibrations within a 7 h.p. vertical crankshaft engine. The use of the rigid sleeves 56 permits the engine to be accurately and firmly mounted upon the frame 14, while the natural resiliency of the base plate 24, and the utilization of the elastomer vibration dampening members 72 permits the horizontal vibrations to be controlled and dampened without being significantly transmitted to the frame 14. By relating the axes of the sleeves 56 and members 72 to the center of gravity of the engine the life of the elastomer sleeves 72 is extended to such a degree as to substantially eliminate the sleeves as a source of potential problems, and as the use of the base plate 24 permits the engine mounting flange 16 to be mounted lower than the plane of the frame surface 20 a recessed engine mounting is provided permitting a lower "profile" than would heretofore be possible.

It is appreciated that various modifications to the inventive concept may be apparent to those skilled in the art and it is intended that the invention be defined only by the following claims:

I claim:

1. An engine mount for mounting an internal combustion engine having a vertically oriented crankshaft on a substantially horizontal supporting member comprising, in combination, engine mounting anchors fixed with respect to the engine, each of said anchors including a first bearing surface, said anchors being angularly spaced about the axis of the engine crankshaft, mounting pads defined on the supporting member, each of said pads including a second bearing surface disposed in opposed relationship to an anchor first bearing surface, a plurality of elongated support elements, a support element extending from each of said pads to an anchor, said support elements each having an axis and ends, one of said ends of each support element engaging a first bearing surface and the other end engaging the opposed second bearing surface, the projection of the axes of each of said support elements passing through the center of gravity of the internal combustion engine, a portion of said support elements comprising resilient vibration dampeners, and at least one of said support elements being rigid.

2. In an engine mount as in claim 1 wherein said support elements are related in diametrically opposed relation to each other with respect to the engine crankshaft axis, one support element of each opposed pair being rigid and the other support element of the pair being of a resilient vibration dampening character.

3. In an engine mount as in claim 2 wherein the rigid support elements are disposed adjacent each other, and the vibration dampening support elements are disposed adjacent each other.

4. In an engine mount as in claim 1, an engine base plate having a substantially horizontally disposed central region rigidly affixed to the engine and a peripheral region, an opening defined in said central region receiving the engine crankshaft, said engine mounting anchors being defined on said base plate peripheral region.

6. In an engine mount as in claim 4 wherein four engine mounting anchors are defined on said base plate peripheral region, two adjacent support elements rigidly interconnecting two of said anchors with two supporting member pads and two vibration dampening support elements interconnecting the other two anchors with two supporting member pads.

7. In an engine mount as in claim 6 wherein said rigid support elements comprise a metallic bored sleeve engaging the associated first and second bearing surfaces, a bolt extending through each sleeve and through holes defined in the associated anchor and pad, and said vibration dampening support elements comprise elastomer elements interposed between the associated first and second bearing surfaces.